(12) United States Patent
Zheng (10) Patent No.: US 11,279,489 B2
(45) Date of Patent: Mar. 22, 2022

(54) LIE-FLAT PASSENGER SEAT CONFIGURATIONS FOR TRANSPORTATION

(71) Applicant: Jing Zheng, El Paso, TX (US)

(72) Inventor: Jing Zheng, El Paso, TX (US)

(*) Notice: Subject to any disclaimer, the term of this patent is extended or adjusted under 35 U.S.C. 154(b) by 603 days.

(21) Appl. No.: 16/167,468

(22) Filed: Oct. 22, 2018

(65) Prior Publication Data
US 2019/0127071 A1    May 2, 2019

Related U.S. Application Data

(60) Provisional application No. 62/577,682, filed on Oct. 26, 2017.

(51) Int. Cl.
*B64D 11/06* (2006.01)

(52) U.S. Cl.
CPC ...... *B64D 11/0641* (2014.12); *B64D 11/0601* (2014.12); *B64D 11/064* (2014.12); *B64D 11/0606* (2014.12); *B64D 11/0636* (2014.12); *B64D 11/0643* (2014.12)

(58) Field of Classification Search
CPC ............ B64D 11/0606; B64D 11/0643; B64D 11/0636; B64D 11/0627; B64D 11/06395; B64D 11/0639; B64D 11/0648; B64D 11/0696; B64D 11/0641; B64D 11/064; B64D 11/0601; B61D 1/00; B61D 13/00; B61D 33/021; A61G 5/1067; A47C 1/143; B60N 2/005; B60N 2/001
See application file for complete search history.

(56) References Cited

U.S. PATENT DOCUMENTS

| | | | | |
|---|---|---|---|---|
| 1,922,502 A | * | 8/1933 | Scragg | B60N 2/3097 297/116 |
| 2,523,960 A | * | 9/1950 | Liljengren | B60N 2/30 297/43 |
| 2,629,425 A | * | 2/1953 | James | B64D 11/0641 297/317 |
| 2,808,787 A | * | 10/1957 | Murphy | B61D 1/02 105/315 |
| 4,305,168 A | * | 12/1981 | Holter | A47C 21/044 5/284 |

(Continued)

*Primary Examiner* — Medhat Badawi
*Assistant Examiner* — Vicente Rodriguez
(74) *Attorney, Agent, or Firm* — Han IP PLLC; Andy M. Han (57) ABSTRACT

Example lie-flat passenger seat configurations for transportation are described. A non-elevated passenger seat includes a seat base and a seatback pivotably connected to the sliding bar. The seat base may be opened upwardly or downwardly. The seatback may be opened sideway such that a space originally used for seat base and seatback is converted to a passage accessible by the passenger. An elevated-height passenger seat also includes a seat base, a seatback pivotably connected to the seat base, and a hinge at an upper portion of the seatback. The elevated-height passenger seat may rotate upwardly around the hinge. When the elevated-height passenger seat rotates upwardly, the elevated-height passenger seat transitions from a seating position to an elevated position with the seat base and the seatback forming a flat bed such that the passenger can lie flat on the flat bed formed by the seat base and the seatback.

30 Claims, 6 Drawing Sheets

(56) References Cited

U.S. PATENT DOCUMENTS

| | | | | |
|---|---|---|---|---|
| 5,795,018 A * | 8/1998 | Schumacher | ...... | B64D 11/0632 |
| | | | | 297/184.17 |
| 8,118,365 B2 * | 2/2012 | Henshaw | ............... | B60N 2/242 |
| | | | | 297/245 |
| 8,308,238 B2 * | 11/2012 | Imaoka | ................... | B60R 22/26 |
| | | | | 297/236 |
| 10,370,109 B2 * | 8/2019 | Fortin | ................... | B60N 2/2209 |
| 2004/0035980 A1 * | 2/2004 | McDonnell | ........ | B64D 11/0641 |
| | | | | 244/118.6 |
| 2011/0260482 A1 * | 10/2011 | Bourgraf | ................ | A61G 3/001 |
| | | | | 296/19 |
| 2013/0320139 A1 * | 12/2013 | Cho | ................... | B64D 11/0641 |
| | | | | 244/118.6 |
| 2014/0166808 A1 * | 6/2014 | Boenning | ............ | B60N 2/3002 |
| | | | | 244/118.6 |

\* cited by examiner

LIE-FLAT PASSENGER SEAT CONFIGURATIONS FOR TRANSPORTATION

CROSS REFERENCE TO RELATED PATENT APPLICATION(S)

The present disclosure is part of a non-provisional application claiming the priority benefit of U.S. Provisional Patent Application No. 62/577,682 filed on 26 Oct. 2017, the content of which is incorporated by reference in its entirety.

TECHNICAL FIELD

The present disclosure generally relates to passenger transportation. More specifically, the present disclosure relates to a lie-flat passenger seat configurations for transportation.

BACKGROUND

Airline seats are passenger seats on an aircraft in which passengers are accommodated for the duration of a journey. Such seats are usually arranged in rows running across the fuselage of the aircraft. As many passengers travel with carryon luggage, often time there is insufficient space in the luggage compartment of an aircraft to accommodate all the carryon luggage of its passengers. Moreover, generally speaking regarding seats of the economy or coach class, there is insufficient free space, or leg room, between adjacent rows of passenger seats to enable seats to recline to form flat beds.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, an apparatus implementable in a transportation may include a non-elevated passenger seat, which may include a seat base on which a passenger can sit and a seatback pivotably connected to a sliding bar and configured to support a torso of the passenger when the passenger is seated on the seat base. The seat base may be configured to move forward and open upwardly or downwardly (although shown only upwardly in the figures) with respect to the passenger. The seatback may be configured to transition between a vertical position and a lie-flat position which is at a same height as the seat base. The seatback may be also configured to open sideway such that a space originally used for seat base and seatback is converted to a passage accessible by the passenger.

In one aspect, an apparatus implementable in a transportation may include an elevated-height passenger seat, which may include a seat base on which a passenger can sit, a seatback pivotably connected to the seat base and configured to support a torso of the passenger when the passenger is seated on the seat base, and a hinge at an upper portion of the seatback. The passenger seat may be configured to rotate upwardly around the hinge. When the passenger seat rotates upwardly around the hinge, the passenger seat may transition from a seating position to a lie-flat position with the seat base and the seatback forming a flat bed such that the passenger can lie flat on the flat bed formed by the seat base and the seatback. The elevated-height seat may be at an elevated height when in the lie-flat position.

In one aspect, an apparatus implementable in a cabin of a transportation may include a row of a plurality of non-elevated passenger seats and a row of a plurality of elevated-height passenger seats in front of or behind the row of non-elevated passenger seats. Each of the non-elevated passenger seats may include a seat base on which a first passenger can sit and a seatback pivotably connected to a sliding bar and configured to support a torso of the first passenger when the first passenger is seated on the seat base. Each of the elevated-height passenger seats may include a seat base on which a second passenger can sit, a seatback pivotably connected to the seat base and configured to support a torso of the second passenger when the second passenger is seated on the seat base, and a hinge at an upper portion of the seatback. With respect to each of the non-elevated passenger seats except one that is by an aisle of the cabin, the seat base may be configured to move forward and open upwardly or downwardly (although shown only upwardly in the figures) with respect to the passenger, the seatback may be configured to transition between a vertical position and a lie-flat position which is at a same height as the seat base, and the seatback may be also configured to open sideway such that a space originally used for seat base and seatback is converted to a passage accessible by the passenger. With respect to each of the elevated-height passenger seats, the passenger seat may be configured to rotate upwardly around the hinge, when the passenger seat rotates upwardly around the hinge, the passenger seat may transition from a seating position to a lie-flat position with the seat base and the seatback forming a flat bed such that the passenger can lie flat on the flat bed formed by the seat base and the seatback, and the elevated-height seat may be at an elevated height when in the lie-flat position.

It is noteworthy that, although description provided herein may be in the context of airborne transportation, the proposed concepts, schemes and any variation(s)/derivative(s) thereof may be implemented in, for and by other types of transportation such as land-based transportation and seaborne transportation. Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF THE PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

The present disclosure proposes a set of lie-flat seat design that allows passengers of a transportation, regardless of class, to lie flat with 100% aisle access and easy taxi, takeoff and landing (TTL) transition while meeting requirement of a certain level of passenger capacity. Compared to existing cabin seat design for commercial aircrafts, the lie-flat seat design in accordance with the present disclosure provide a number of benefits.

Firstly, by using an openable seat and seat back mechanism, along with a simple elevating mechanism, passengers on adjacent rows may be able to share an unobstructed passage to access an aisle without interfering any other passenger, whether in a seating position or a lying-flat position. Due to this benefit, a wide-body and single-aisle design may be feasible for aircraft seating design.

Secondly, by comprehensive usage of a roller panel, normal privacy may be provided for all passenger while ensuring safety for raised lie-flat passengers. Accordingly, seat width of the proposed configuration may be comparable to the densest configuration of current airline offering.

Thirdly, by overlapping a space between an ordinary lie-flat seating configuration with an elevated lie-flat seating configuration, relatively small row pitch may be achieved. Together with aforementioned benefits, an airline may be able to offer lie-flat seating service to all passengers while maintaining existing capacity. Moreover, it is believed that the airline may continue to offer two or three classes of seating to distinguish tiered service. Accordingly, larger revenue and passenger satisfaction per flight could be expected.

In addition, the proposed design provides dedicated luggage compartment located on the floor instead of the overhead bin, such that luggage and personal belongings that are stowed away can be within arm's reach of each passenger. Advantageously, this feature eliminates lifting for passenger or flight attendant as well as the need to hunt for available bin space. The luggage size and quantity of the proposed design can match or exceed current metrics according to airline policy.

Furthermore, the proposed design may be compliant with FAA/EASA safety requirement for seats. Nevertheless, reconfiguration of ATA-21 (air conditioning) and ATA-35 (oxygen) are foreseeable; emergency evacuation re-evaluation may be warranted but promising.

Illustrative Implementations

Figure 1:
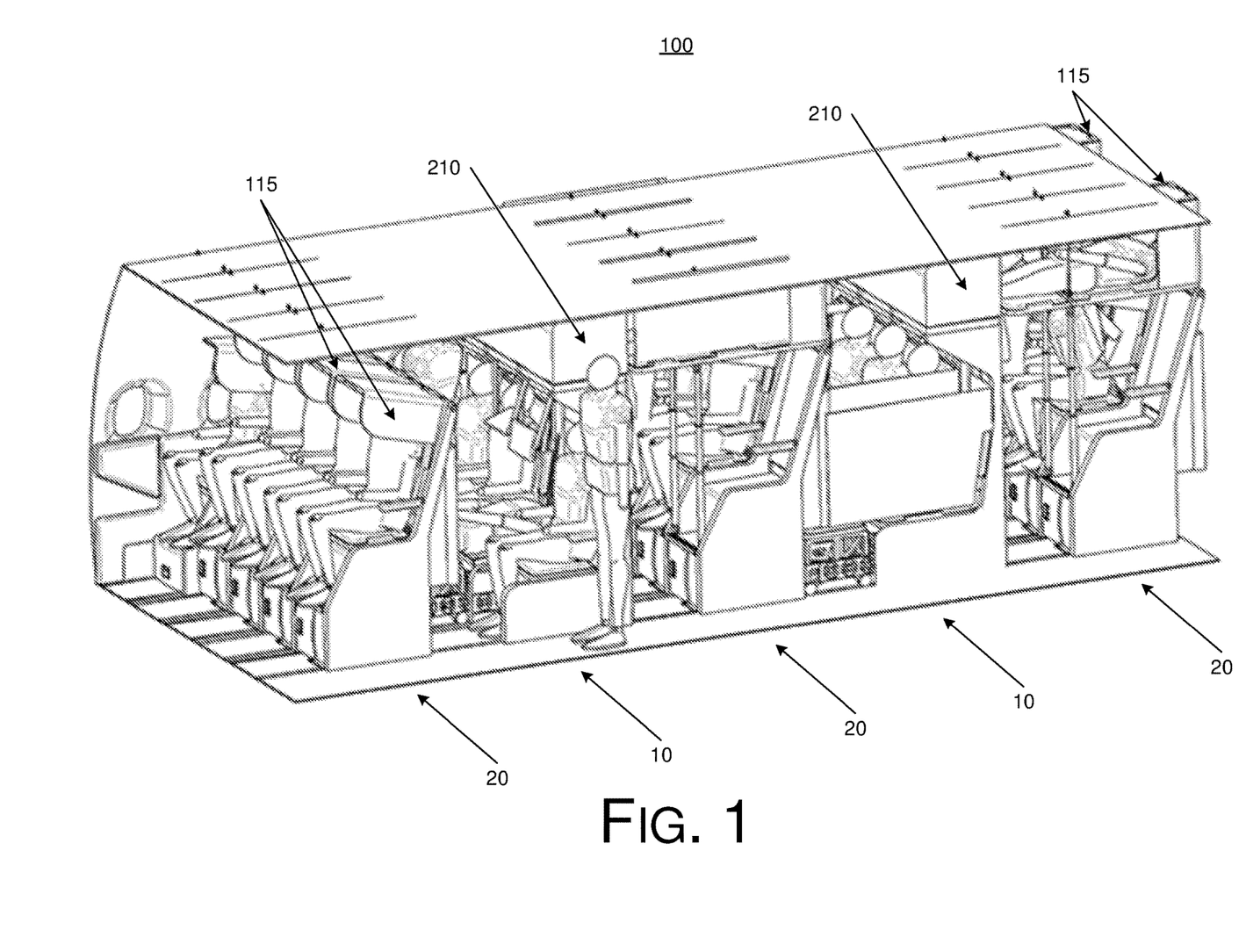
FIG. 1 is a diagram of an example assembly of a single-aisle all lie-flat cabin in accordance with an embodiment of the present disclosure.

Under the proposed design in accordance with the present disclosure, there are two distinguished seat configurations, herein referred to as the Normal Height Seating (NHS) configuration and the Elevated Height seating (EHS) configuration. FIG. 1 illustrates an example assembly 100 of a single-aisle all lie-flat cabin in accordance with an embodiment of the present disclosure. Assembly 100 may include at least one row of non-elevated or normal-height seats 10 in NHS configuration as well as at least one row of elevated or enhanced-height seats 20 in EHS configuration. In the example shown in FIG. 1, assembly 100 has rows of non-elevated seats 10 in NHS configuration and rows of elevated-height seats 20 in EHS configuration arranged in an interlaced manner. That is, at least one row of elevated-height seats 20 in EHS configuration is sandwiched between respective two adjacent rows of non-elevated seats 10 in NHS configuration, and at least one row of non-elevated seats 10 in NHS configuration is sandwiched between respective two adjacent rows of elevated-height seats 20 in EHS configuration.

In the example shown in FIG. 1, in the third row of elevated-height seats 20 (or the fifth row from the left), the passenger seat next to the aisle is converted into a lie-flat bed and the respective passenger is lying on the bed with his/her foot extended into a corresponding foot compartment 210 of a row of non-elevated seats 10 in the front. Additionally, in the example shown in FIG. 1, in the second row of non-elevated seats 10 (or the fourth row from the left), the passenger seat next to the aisle is converted into a lie-flat bed and the respective passenger is lying on the bed with privacy curtains on both sides of the seat drawn or pulled out (in use) to provide privacy on both sides of that seat. Moreover, in the second row of elevated-height seats 20 (or the third row from the left), the passenger seat next to the aisle is also converted into a lie-flat bed and the respective passenger is lying on the bed with his/her foot extended into a corresponding foot compartment 210 and with at least the privacy curtain on the aisle side drawn or pulled out to provide privacy on the aisle side.

Furthermore, in the example shown in FIG. 1, each elevated-height seat may be provided with a respective hood 115. Each hood 115 may be rotated up and down when the respective elevated-height seat is in the seating position. However, when the seat is in the lie-flat position, the hood 115 is vertical to a surface of the seatback. When an elevated-height seat is converted into a lie-flat bed (e.g., such as the aisle-side seat of the fifth row in FIG. 1), the hood 115 is rotated (e.g., up to 90°) to provide privacy for the passenger of that seat from the back side thereof. Moreover, the hood 115 may function as an infotainment module. That is, each hood 115 may be a mounting base for a user interface (e.g., a touch sensing panel) that is capable of providing audio and video information to the passenger as well as receiving user input (e.g., via touch sensing of a display panel or any other suitable input method) to provide information (e.g., flight status) as well as entertainment (e.g., playing of movies, television shows, documentaries and/or music).

Figure 2:
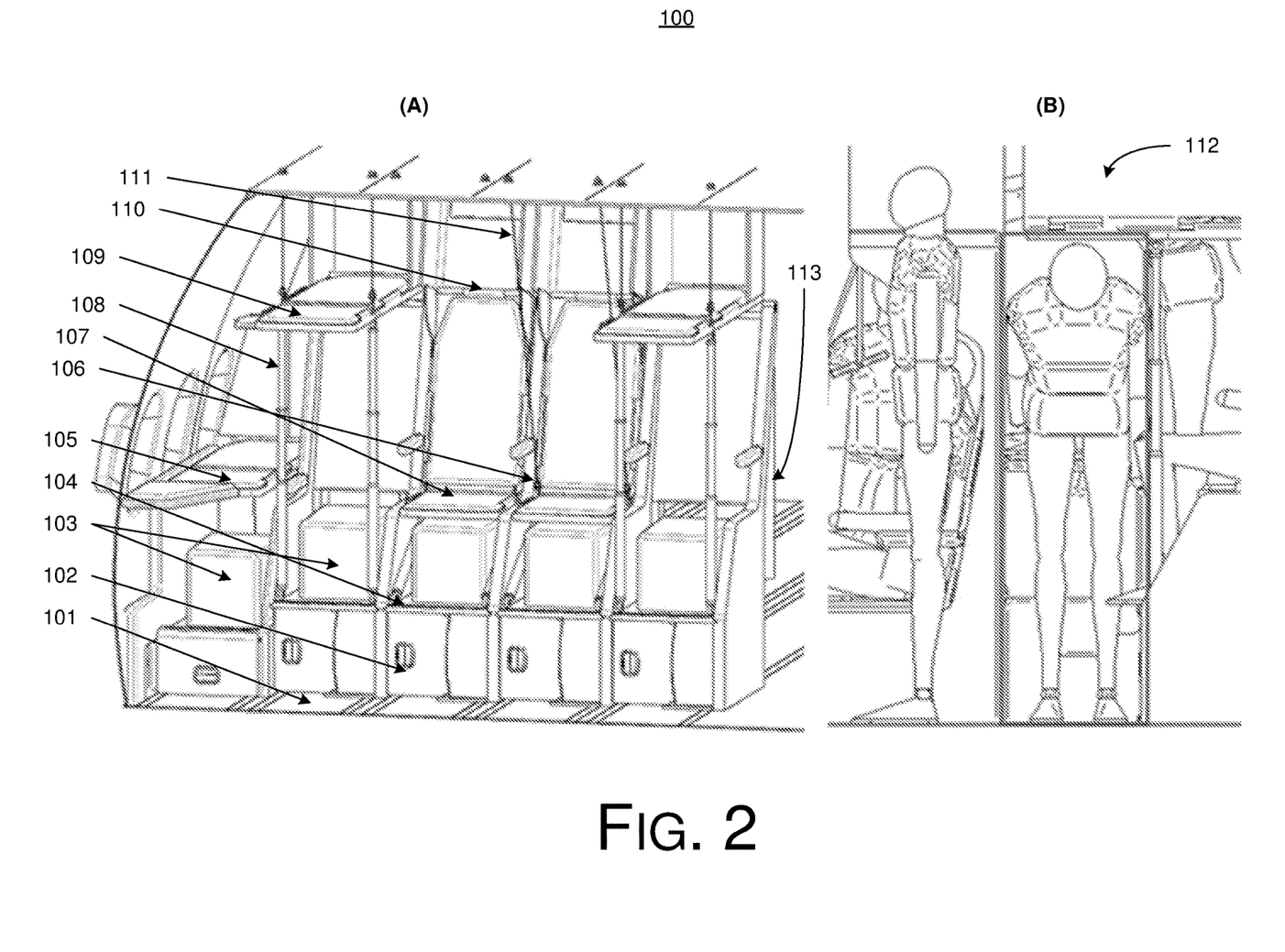
FIG. 2 is a diagram of an example design of one row of elevated-height seats in an enhanced-height configuration along a common passage in accordance with an embodiment of the present disclosure.

FIG. 2 illustrates an example design of one row of elevated-height seats in the EHS configuration along a common passage 101 in accordance with an embodiment of the present disclosure. Referring to part (A) of FIG. 2, in assembly 100, common passage 101 along the row of elevated-height seats in the EHS configuration can be used by passengers of this row as well as by those on an adjacent row of non-elevated seats (not shown). In some implementations, the height of elevated-height seats may be about 34½", which may be a little bit higher than a normal bar high chair, and can easily be accessed by stepping on the step that is on top of the luggage compartment 104.

Figure 3:
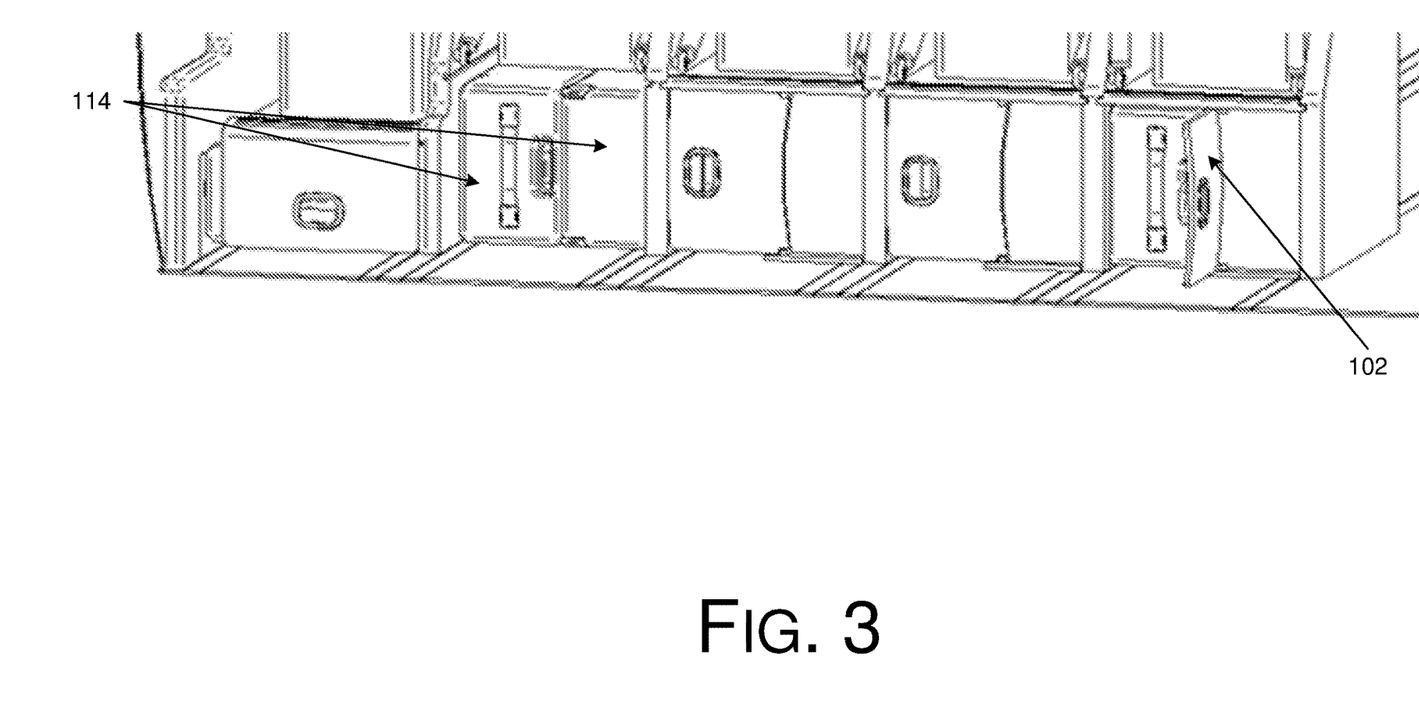
FIG. 3 is a diagram of an example design of a luggage compartment for passenger on adjacent row in accordance with an embodiment of the present disclosure.

FIG. 3 illustrates an example design of a luggage compartment for passenger on adjacent row in accordance with an embodiment of the present disclosure. Each elevated-height seat may be configured with a corresponding luggage compartment underneath the footstep 104 that is at least 16"×19"×26" in volume. The luggage compartment may be sizable to house two pieces of standard-sized carryon luggage 114 (e.g., 14"×9"×22"). Advantageously, this means the passenger on this seat may share this compartment with the passenger of a seat behind for carryon luggage. For single-deck twin-engine wide-body aircrafts, window seats may tend to be more restricted or otherwise cramped in terms of space compared to non-window seas. As shown in assembly 100, window seats in the EHS configuration may have a luggage compartment with a lower profile (e.g., 30"×10"×22"), although it may still have the capacity to house two pieces standard-sized luggage 114 (e.g., 14"×9"×22") in different orientation than in luggage compartments for non-window seats. In the example shown in FIG. 3, two pieces of luggage 114 are placed underneath one non-window seat (with one step 104 removed for illustration purpose). Each luggage 114 may be accessed by the passenger of the seat to the front as well as the passenger directly to the back. In some implementations, there may be a luggage compartment door 102 on the front side of the luggage compartment 104 and on the back side thereof.

In some implementations, each foot compartment 103 may function as a foot compartment for passengers of non-elevated seats on the back. Each foot compartment 103 may double as an additional luggage compartment for additional carryon luggage such as purse, backpack, computer bags and the like. The foot compartment for each passenger of an elevated-height seat is located on top of the NHS configuration, shown later.

In some implementations, each window-side elevated-height seat may be in a lie-flat configuration 105. For twin-engine wide-body aircrafts, this seat may be designed similar to a Lazy Boy couch seat, which may allow rotation and/or sliding of the seat and seatback to change from an up-right position to a lie-flat position through a pivot point close to the hip area of the seat. Each standard elevated-height seat may rotate upwardly around a hinge 110. To actuate the standard elevated-height seat from an up-right position 107 to a lie-flat position 109, two hook lines 111 may be lowered (or permanently connected) to engage with a pivot link 106. The hook lines 111 may be connected to a power wrench (not shown) located on an upper structure of the aircraft inside of the roof (not shown). Together with a hydraulic/pneumatic/electric linear actuator 108, the hook lines may aid the hydraulic/pneumatic/electric linear actuator 108 to pass a dead point and double as a safety guard to prevent a passenger from falling off the lie-flat seat.

In some implementations, a curtain roller panel 112 may be lowered and attached to the seat(s) for fastening to provide absolute safety for passengers against falling. In some implementations, there may be sensors utilized to prevent possible bumping and collision of a passenger with an adjacent passenger during the process of configuration change of the respective seat of the passenger. In some implementations, a roller container 113 of a privacy curtain may be provided for passengers of non-elevated seats.

In some implementations, a length of a non-window-side lie-flat bed may be 75", while a length of a window-side bed may be 70". For the lower deck of a jumbo jet such as Boeing B747 or Airbus A380, for example, since the wall are less curved, the length of the window-side beds may be the same as that of the non-window-side beds. Part (B) of FIG. 2 shows a seat in the lie-flat position and another seat in the up-right position. Either in the up-right position or the lie-flat position, the common passage 101 may maintain more than 20" space above the knee level, thus qualifying common passage 101 as an "aisle" according to the Federal Aviation Regulations FAR-25 standard. When seats are in the lie-flat position, the height of common passage 101 may be limited to about 64", which is less ideal but still far easier for passengers to maneuver compared to that of the normal economic seats.

In some implementations, there may be one or more sensors implemented or otherwise installed on common passage 101 as safety measures for each row of elevated-height seats such that any elevated-height seat in a lie-flat position may not be lowered to a seating position when there is a passenger in common passage 101. For instance, when existence of any passenger in common passage 101 is detected by the one or more sensors, an interlock mechanism (not shown) may be activated to prevent any seat in the row that is in the lie-flat position from being converted back to the seating position. The one or more sensors may include an ultrasonic sensor, an infrared sensor, a photonic sensor, a magnetic sensor, an electromagnetic sensor, a piezoelectric sensor and/or an image sensor.

Figure 4:
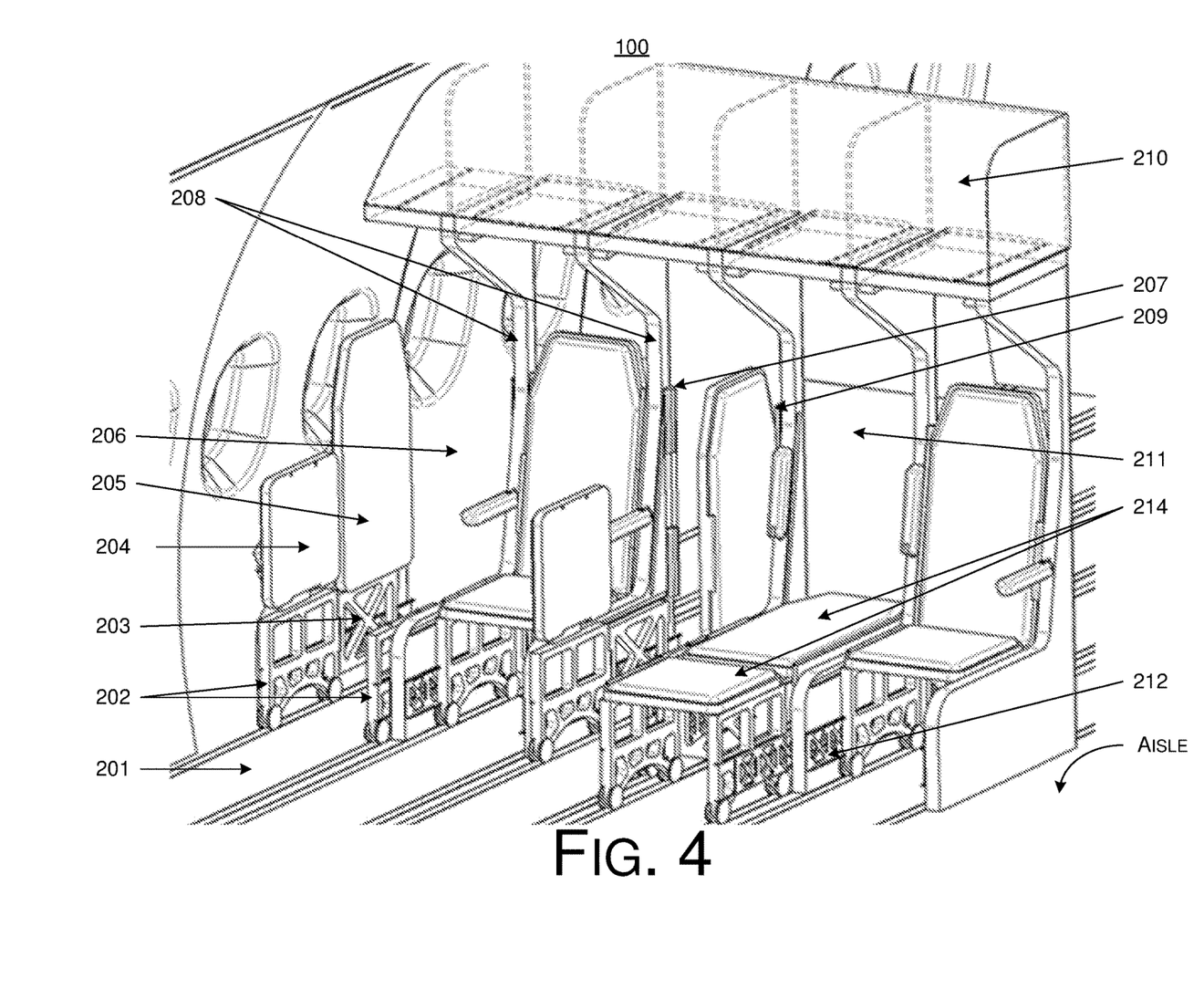
FIG. 4 is a diagram of an example design of a one row of non-elevated seats in a normal-height configuration in accordance with an embodiment of the present disclosure.

FIG. 4 illustrates an example design 400 of one row of non-elevated seats in the NHS configuration in accordance with an embodiment of the present disclosure. Referring to FIG. 4, the concept of the NHS configuration is to allow the seat and seatback openable so that a passenger can use his/her own seat area as a passage to access the common passage on the back to reach an aisle.

In some implementations, the floor may be configured with grooves or seat rails 201 that guide the seat cart 202. The two sides of the seat cart 202 may be connected to a corresponding side panel 208 through an interconnecting panel 212, which may be somewhat like a three-piece drawer sliding guide. In some implementations, a lateral brace 203 may swing open or lock closed to an opposite side of the seat cart 202 to add rigidity to the seat cart 202.

In some implementations, each passenger seat may include a seat base 204 (on which a passenger may sit) and a seatback 205 pivotably connected to seat panels 208 (behind the seatback 205). Seat base 204 may be opened upwardly, or downwardly (although shown only upwardly in the figures). Seatback 205 may support a torso or back of a passenger when the passenger is seated on seat base 204. Seatback 205 may be opened sideway such that a passage space 206 originally used for seat base 204 and seatback 205 can be converted to a passage spatially connected to common passage 101 on the back (behind the seat). The seat base 204 and the seatback 205 of each non-elevated seat can be opened to form a respective passage space 206 for the passenger on this seat alone, except the aisle seat (which has no need of doing this because it is adjacent to the aisle). Advantageously, each passenger can freely access the main aisle (e.g., to go to a lavatory) even if one or more other seats in the same row is/are in the lie-flat position and obstructing the common passage (e.g., common passage 101) for that row. In the example shown in FIG. 4, the second seat from the aisle in the row of non-elevated seats is in the lie-flat position, thereby obstructing access to the aisle via the common passage of this row for passengers of the third, fourth and fifth seats from the aisle. As shown in FIG. 4, each of the third seat and the fifth seat (which happens to be a window-side seat in this example) is opened up to provide a passage space for its respective passenger to access the aisle by using the common passage behind this row.

In some implementations, a seat frame of the seatback 205 may be connected to a swing sliding bar 207 and/or a supporting sliding bar 209, thus allowing the seat frame of seatback 205 to swing open or closed. The sliding bars 207 and 209 may be connected to rollers inside of a respective panel 208. The swing sliding bar 207 and supporting sliding bar 209 can roll and slide about the seat panel 208 so that the respective seat can transition from the seating position to the lie-flat position, hence providing a flat surface 214 of the seat base 204 and the seatback 205 such that the passenger of each non-elevated seat can lie flat as well. In some implementations, assembly 100 may include roller panels 211 that provide privacy to the passengers from the back. By opening the seat base 204, the seatback 205, the lateral brace 203 and a back roller curtain 211, a passenger of a non-elevated seat may have access to the passage on the back. In some implementations, assembly 100 may also include a foot compartment 210 for passengers of elevated-height seats. The foot compartment 210 may also double as an additional luggage compartment for each corresponding passenger.

Figure 5:
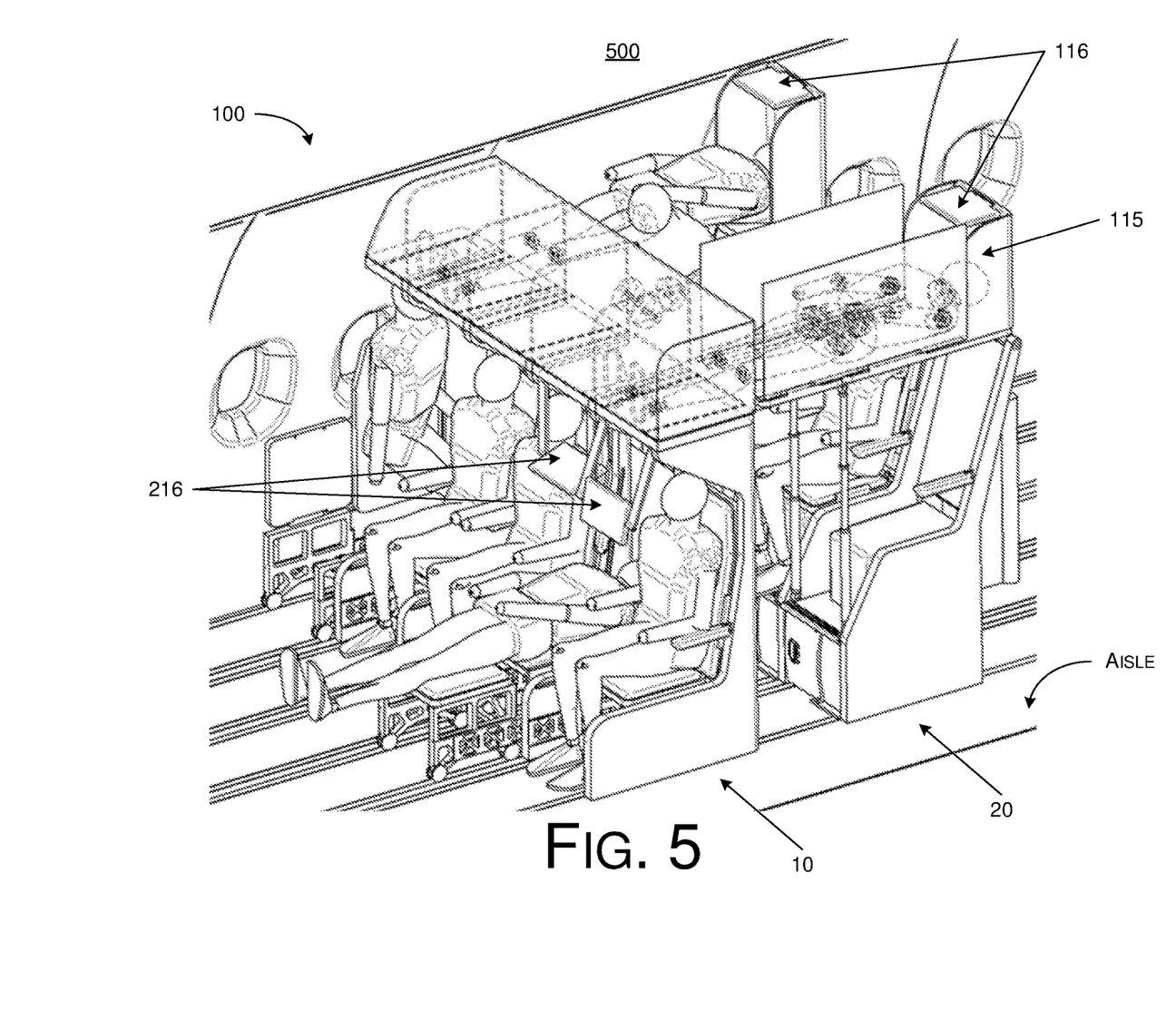
FIG. 5 is a diagram of an example usage scenario in accordance with an embodiment of the present disclosure.

FIG. 5 illustrates an example usage scenario 500 in assembly 100 in accordance with an embodiment of the present disclosure. In scenario 500, in row 10 of non-elevated seats, the second seat from the aisle is in the lie-flat position as a flat bed with its passenger lying thereon. Also, in row 10 of non-elevated seats, the fifth seat (which happens to be a window-side seat) is opened up to provide a passage space for its passenger to access the common passage of row 20 of elevated-height seats behind it since the common passage of row 10 is obstructed by the flat bed of the second seat.

In scenario 500, in row 20 of elevated-height seats, the first seat and the fourth seat from the aisle are each in the lie-flat position as a flat bed with its passenger lying thereon. The hood 115 of each of the first seat and the fourth seat from the aisle provides privacy on the back side. Also, the first from the aisle has privacy curtains drawn on its both sides. As shown in FIG. 5, even with the first seat from the aisle in the lie-flat position, the common passage of row 20 is not obstructed for access to the aisle.

In some implementations, each seat is equipped with a user interface. For instance, each non-elevated seat in row 10 may be equipped with a user interface 116 and each elevated-height seat in row 20 may be equipped with a user interface 216. Each user interface 116/216 may be an in-flight entertainment (IFE) screen panel (e.g., touch sensing panel) that is capable of providing audio and video information to the passenger as well as receiving user input (e.g., via touch sensing of the display panel or any other suitable input method) to provide information (e.g., flight status) as well as entertainment (e.g., playing of movies, television shows, documentaries and/or music). Each user interface 216 may be pivotably stowed below foot compartment 210. Each user interface 116 may be pivotably stowed in a respective hood 115.

Figure 6:
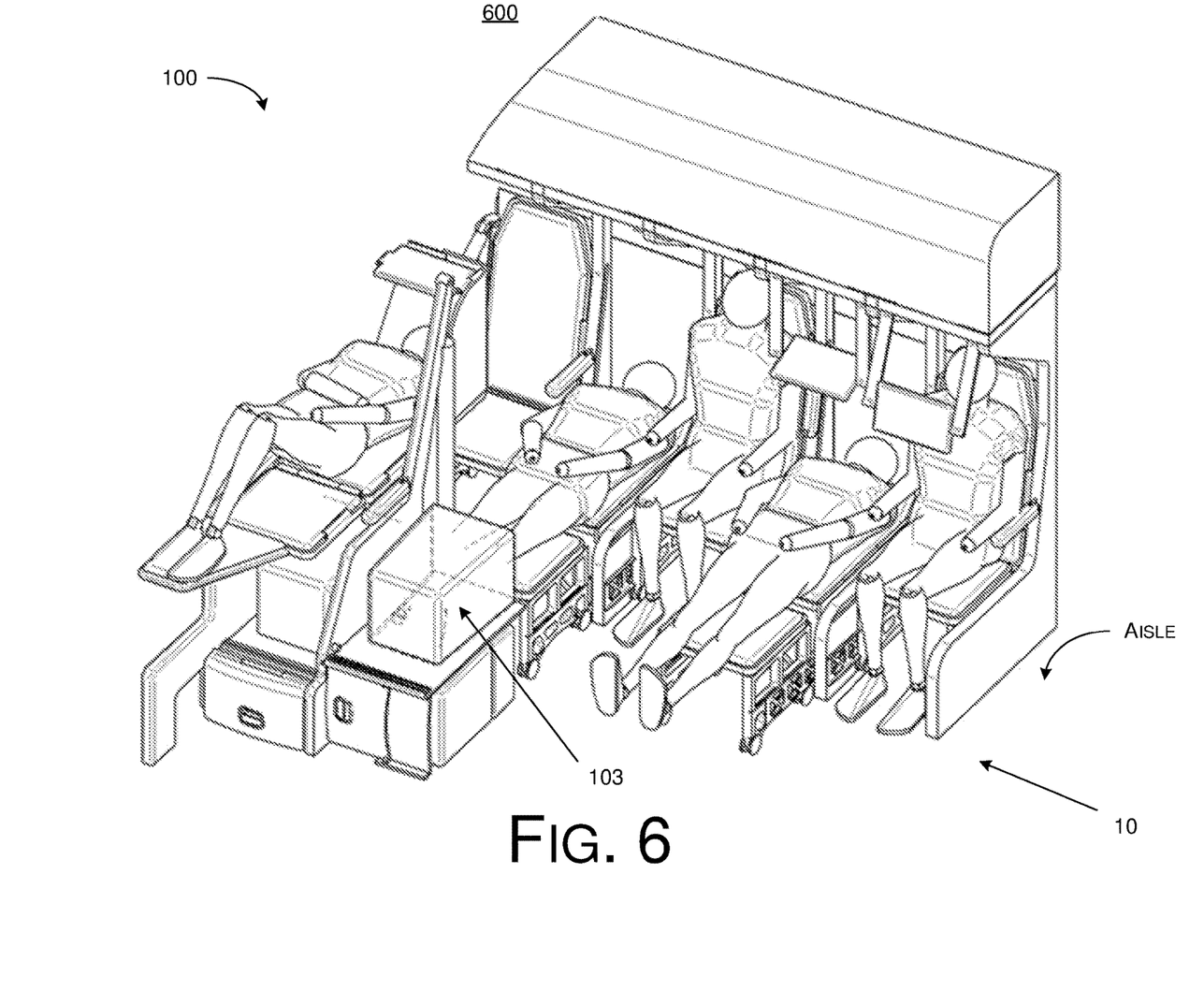
FIG. 6 is a diagram of an example usage scenario in accordance with an embodiment of the present disclosure.

FIG. 6 illustrates an example usage scenario 600 in assembly 100 in accordance with an embodiment of the present disclosure. In scenario 600, some of the seats are in the seating position and others are in the lie-flat position. In particular, in row 10 of non-elevated seats, each of the second seat, the fourth seat and the fifth seat in row 20 (which happens to be a widow-side seat in this example) from the aisle is in the lie-flat position as a flat bed with its passenger lying thereon. Each of one or more passengers of row 10 can extend his/her feet into foot compartment 103, which is below a respective elevated-height seat (not shown) of a row in front of row 10. In FIG. 5, to avoid obscuring viewing, the passenger of the fourth seat from the aisle is shown to have his/her feet extended into the respective foot compartment 103.

Highlights of Select Features

In view of the above, certain features of various implementations in accordance with the present disclosure are highlighted below.

In one aspect, an apparatus implementable in a transportation may include a non-elevated passenger seat, which may include a seat base on which a passenger can sit and a seatback pivotably connected to a sliding bar and configured to support a torso of the passenger when the passenger is seated on the seat base. The seat base may be configured to move forward and open upwardly or downwardly (although shown only upwardly in the figures) with respect to the passenger. The seatback may be configured to transition between a vertical position and a lie-flat position which is at a same height as the seat base. The seatback may be also configured to open sideway such that a space originally used for seat base and seatback is converted to a passage accessible by the passenger.

In some implementations, a seat frame of the seatback and the seat base may be configured to slide forward with respect to the passenger when the passenger is seated on the seat base. As the seat frame and the seat base slide forward, the seatback may pivot and slide to form a flat bed together with the seat base such that the passenger can lie flat on the flat bed formed by the seat base and the seatback.

In some implementations, a seat frame of the seatback may be connected to the sliding bar that allows the seat frame of the seatback to swing open or closed.

In some implementations, the apparatus may also include a seat cart below the seat base. The seat cart may allow the seat base to move forward and the seatback to rotate from the vertical position to the lie-flat position to convert the non-elevated seat from a seating position to a flat bed.

In some implementations, the apparatus may also include a roller curtain disposed on a first side of the passenger seat. The roller curtain may be configured to expand and retract between an open position and a closed position. When in the open position, the roller curtain may provide privacy on the first side of the passenger seat for the passenger.

In some implementations, the apparatus may also include a foot compartment above the non-elevated passenger seat and configured to receive a portion of another passenger of an elevated-height seat that is behind the non-elevated seat and in a lie-flat position.

In some implementations, the apparatus may also include a foot compartment in front of the non-elevated passenger seat and configured to receive a portion of the passenger when the non-elevated passenger seat is in a lie-flat position.

In some implementations, the apparatus may also include a luggage compartment below the foot compartment and configured to accommodate one or more pieces of luggage. The luggage compartment may be accessible by the passenger of the non-elevated passenger seat as well as another passenger of a seat in front of the non-elevated passenger seat.

In one aspect, an apparatus implementable in a transportation may include an elevated-height passenger seat, which may include a seat base on which a passenger can sit, a seatback pivotably connected to the seat base and configured to support a torso of the passenger when the passenger is seated on the seat base, and a hinge at an upper portion of the seatback. The passenger seat may be configured to rotate upwardly around the hinge. When the passenger seat rotates upwardly around the hinge, the passenger seat may transition from a seating position to a lie-flat position with the seat base and the seatback forming a flat bed such that the passenger can lie flat on the flat bed formed by the seat base and the seatback. The elevated-height seat may be at an elevated height when in the lie-flat position.

In some implementations, the apparatus may also include a luggage compartment under the seat base and configured to contain one or more pieces of luggage therein. The luggage compartment may be accessible by the passenger and another passenger of another seat behind the passenger seat.

In some implementations, the apparatus may also include a foot compartment under the seat base. The foot compartment may be configured to receive a portion of another passenger of another seat that is behind the elevated-height passenger seat and in a lie-flat position.

In some implementations, the apparatus may also include an electrical, pneumatic or hydraulic actuator configured to rotate the passenger seat around the hinge to transition between the seating position and the elevated position.

In some implementations, the apparatus may also include a roller curtain disposed on a first side of the passenger seat. The roller curtain may be configured to expand and retract between an open position and a closed position. When in the open position, the roller curtain may provide privacy on the first side of the passenger seat for the passenger.

In some implementations, the apparatus may include one or more sensors capable of detected an existence of any passenger in a common passage in which the elevated-height passenger seat is located when the elevated-height passenger seat is in the lie-flat position such that, when an existence of at least one passenger in the common passage is detected, the elevated-height passenger seat is prevented from transitioning to a seating position from the lie-flat position.

In some implementations, the one or more sensors may include an ultrasonic sensor, an infrared sensor, a photonic sensor, a magnetic sensor, an electromagnetic sensor, a piezoelectric sensor, an image sensor, or a combination thereof.

In some implementations, the apparatus may also include a hood above the elevated-height passenger seat that rotates to be vertical to a surface of the seatback when the elevated-height passenger seat is transitioned from the seating position to the lie-flat position to provide privacy from behind for the passenger.

In one aspect, an apparatus implementable in a cabin of a transportation may include a row of a plurality of non-elevated passenger seats and a row of a plurality of elevated-height passenger seats in front of or behind the row of non-elevated passenger seats. Each of the non-elevated passenger seats may include a seat base on which a first passenger can sit and a seatback pivotably connected to a sliding bar and configured to support a torso of the first passenger when the first passenger is seated on the seat base. Each of the elevated-height passenger seats may include a seat base on which a second passenger can sit, a seatback pivotably connected to the seat base and configured to support a torso of the second passenger when the second passenger is seated on the seat base, and a hinge at an upper portion of the seatback. With respect to each of the non-elevated passenger seats except one that is by an aisle of the cabin, the seat base may be configured to move forward and open upwardly or downwardly (shown only in upwardly) with respect to the passenger, the seatback may be configured to transition between a vertical position and a lie-flat position which is at a same height as the seat base, and the seatback may be also configured to open sideway such that a space originally used for seat base and seatback is converted to a passage accessible by the passenger. With respect to each of the elevated-height passenger seats, the passenger seat may be configured to rotate upwardly around the hinge, when the passenger seat rotates upwardly around the hinge, the passenger seat may transition from a seating position to a lie-flat position with the seat base and the seatback forming a flat bed such that the passenger can lie flat on the flat bed formed by the seat base and the seatback, and the elevated-height seat may be at an elevated height when in the lie-flat position.

In some implementations, with respect to each of the non-elevated seats, a seat frame of the seatback and the seat base may be configured to slide forward with respect to the passenger when the passenger is seated on the seat base. As the seat frame and the seat base slide forward, the seatback may pivot and slide to form a flat bed together with the seat base such that the passenger can lie flat on the flat bed formed by the seat base and the seatback.

In some implementations, a first non-elevated seat of the non-elevated seats may be a window-side seat disposed next to a window of the cabin of the transportation. A height of a flat bed formed by the first non-elevated seat may be lower than a height of each of one or more other flat beds formed by one or more other non-elevated seats of the plurality of non-elevated seats.

In some implementations, with respect to each of the non-elevated seats, a seat frame of the seatback may be connected to a sliding bar that allows the seat frame of the seatback to swing open or closed.

In some implementations, with respect to each of the elevated-height seats, the passenger seat may also include a luggage compartment under the seat base and configured to contain one or more pieces of luggage therein. The luggage compartment may be accessible by the passenger and another passenger of another seat behind the passenger seat.

In some implementations, a first elevated-height seat of the elevated-height seats may be a window-side seat disposed next to a window of the cabin of the transportation. Dimensions of the luggage compartment of the first elevated-height seat may be different from dimensions of the luggage compartment of each of one or more other elevated-height seats of the plurality of elevated-height seats.

In some implementations, with respect to each of the elevated-height seats, the passenger seat may also include an electrical, pneumatic or hydraulic actuator configured to rotate the passenger seat around the hinge to transition between the seating position and the elevated position.

In some implementations, a first elevated-height seat of the elevated-height seats may be a window-side seat disposed next to a window of the cabin of the transportation. A height of a flat bed formed by the first elevated-height seat may be lower than a height of each of one or more other flat beds formed by one or more other elevated-height seats of the plurality of elevated-height seats.

In some implementations, the apparatus may also include a plurality of roller curtains disposed on both sides of each of the non-elevated passenger seats and the elevated-height passenger seats. Each of the roller curtains may be configured to expand and retract between an open position and a closed position. When in the open position, each of the roller curtains may provide privacy on a respective side of a corresponding passenger seat and prevents a respective passenger from falling off a respective seat.

In some implementations, the apparatus may also include a plurality of foot compartments located above the row of the plurality of non-elevated passenger seats. The plurality of foot compartments may be configured to provide additional storage space for passengers of the row of the plurality of elevated-height passenger seats.

In some implementations, the apparatus may also include a plurality of foot compartments each located below a respective one of the elevated-height seats. Each of the foot compartments may be configured to provide additional storage space for a respective passenger of a respective one of the non-elevated seats.

In some implementations, the apparatus may also include a plurality of grooves or seat rails on a floor of the cabin. The grooves or seat rails may be configured to guide seat carts of the non-elevated seats to allow the seat bases and seat frames of the non-elevated seats to slide forward to form flat beds and be locked in place.

In some implementations, the apparatus may, with respect to each of the elevated-height seats, also include one or more sensors capable of detected an existence of any passenger in a common passage in which the elevated-height passenger seat is located when the elevated-height passenger seat is in the lie-flat position such that, when an existence of at least one passenger in the common passage is detected, the elevated-height passenger seat is prevented from transitioning to a seating position from the lie-flat position.

In some implementations, the apparatus, with respect to each of the elevated-height seats, may further include a hood above the elevated-height passenger seat that rotates to be vertical to a surface of the seatback when the elevated-height passenger seat is transitioned from the seating position to the lie-flat position to provide privacy from behind for the passenger.

Additional Notes

It will be apparent to those skilled in the art that various modifications and variations can be made to the structure of the present disclosure without departing from the above-described embodiments or spirit of the present disclosure. Moreover, although examples given in the present disclosure are directed to airline cabin, there is no limit on the applications of embodiments of the embodiments disclosed herein. That is, any suitable implementation or application using an embodiment of the present disclosure, or variation thereof, is still within the scope of the present disclosure. In view of the foregoing, it is intended that the present disclosure cover modifications and variations of the present disclosure in view of the scope of the following claims and their equivalents.

What is claimed is:

1. An apparatus implementable in a transportation, comprising:
   a non-elevated passenger seat comprising:
      a seat base configured to allow a passenger to sit thereon; and
      a seatback pivotably connected to a sliding bar and configured to support a torso of the passenger when the passenger is seated on the seat base,
   wherein:
      the seat base is configured to move forward and open upwardly or downwardly with respect to the passenger,
      the seatback is configured to transition between a vertical position and a lie-flat position which is at a same height as the seat base,
      the seatback is also configured to open sideway such that a space originally used for the seat base and the seatback is converted to a passage accessible by the passenger, and
      when the non-elevated passenger seat and one or more other passenger seats are disposed in two adjacent rows, the passage provides an unobstructed access through an aisle between the two rows by the passenger or another passenger of the one or more other passenger seats without interfering any other passenger regardless of whether the seatback of the non-elevated passenger seat is in the vertical position or the lie-flat position.

2. The apparatus of claim 1, wherein a seat frame of the seatback and the seat base are configured to slide forward with respect to the passenger when the passenger is seated on the seat base, and wherein, as the seat frame and the seat base slide forward, the seatback pivots and slides to form a flat bed together with the seat base to allow the passenger to lie flat on the flat bed formed by the seat base and the seatback.

3. The apparatus of claim 1, wherein a seat frame of the seatback is connected to the sliding bar that allows the seat frame of the seatback to swing open or closed.

4. The apparatus of claim 1, further comprising:
   a seat cart below the seat base, and wherein the seat cart allows the seat base to move forward and the seatback to rotate from the vertical position to the lie-flat position to convert the non-elevated seat from a seating position to a flat bed.

5. The apparatus of claim 1, further comprises:
   a roller curtain disposed on a first side of the non-elevated passenger seat, the roller curtain configured to expand and retract between an open position and a closed position,
   wherein, when in the open position, the roller curtain provides privacy on the first side of the passenger seat for the passenger.

6. The apparatus of claim 1, further comprises:
   a foot compartment above the non-elevated passenger seat and configured to receive a portion of another passenger of an elevated-height seat that is behind the non-elevated seat and in a lie-flat position.

7. The apparatus of claim 1, further comprises:
   a foot compartment in front of the non-elevated passenger seat and configured to receive a portion of the passenger when the non-elevated passenger seat is in a lie-flat position.

8. The apparatus of claim 7, further comprises:
   a luggage compartment below the foot compartment and configured to accommodate one or more pieces of luggage, the luggage compartment accessible by the passenger of the non-elevated passenger seat as well as another passenger of a seat in front of the non-elevated passenger seat.

9. An apparatus implementable in a transportation, comprising;
   an elevated-height passenger seat comprising:
      a seat base configured to allow a passenger to sit thereon;
      a seatback pivotably connected to the seat base and configured to support a torso of the passenger when the passenger is seated on the seat base; and
a hinge at an upper portion of the seatback,
wherein:
the elevated-height passenger seat is configured to rotate upwardly around the hinge,
when the elevated-height passenger seat rotates upwardly around the hinge, the elevated-height passenger seat transitions from a seating position to a lie-flat position with the seat base and the seatback forming a flat bed to allow the passenger to lie flat on the flat bed formed by the seat base and the seatback,
the elevated-height seat is at an elevated height when in the lie-flat position, and
the elevated-height passenger seat is configured to transition between the seating position and the lie-flat position individually and independently without affecting or being affected by one other passenger seat when the elevated-height passenger seat and the other passenger seat are disposed in a same row of passenger seats.

10. The apparatus of claim 9, further comprising:
a luggage compartment under the seat base and configured to contain one or more pieces of luggage therein, and wherein the luggage compartment is accessible by the passenger and another passenger of another seat behind the elevated-height passenger seat.

11. The apparatus of claim 9, further comprising:
a foot compartment under the seat base, and wherein the foot compartment is configured to receive a portion of another passenger of another seat that is behind the elevated-height passenger seat and in a lie-flat position.

12. The apparatus of claim 9, further comprising;
an electrical, pneumatic or hydraulic actuator configured to rotate the elevated-height passenger seat around the hinge to transition between the seating position and the elevated position.

13. The apparatus of claim 9, further comprises:
a roller curtain disposed on a first side of the elevated-height passenger seat, the roller curtain configured to expand and retract between an open position and a closed position,
wherein, when in the open position, the roller curtain provides privacy on the first side of the elevated-height passenger seat for the passenger.

14. The apparatus of claim 9, further comprises:
one or more sensors capable of detected an existence of any passenger in a common passage in which the elevated-height passenger seat is located when the elevated-height passenger seat is in the lie-flat position such that, when an existence of at least one passenger in the common passage is detected, the elevated-height passenger seat is prevented from transitioning to the seating position from the lie-flat position.

15. The apparatus of claim 14, wherein the one or more sensors comprise an ultrasonic sensor, an infrared sensor, a photonic sensor, a magnetic sensor, an electromagnetic sensor, a piezoelectric sensor, an image sensor, or a combination thereof.

16. The apparatus of claim 9, further comprising;
a hood above the elevated-height passenger seat that rotates to a vertical orientation to a surface of the seatback when the elevated-height passenger seat is transitioned from the seating position to the lie-flat position to provide privacy from behind for the passenger.

17. An apparatus implementable in a cabin of a transportation, comprising:
a row of a plurality of non-elevated passenger seats; and
a row of a plurality of elevated-height passenger seats in front of or behind the row of non-elevated passenger seats,
wherein each of the non-elevated passenger seats comprise:
a seat base configured to allow a first passenger to sit thereon; and
a seatback pivotably connected to a sliding bar and configured to support a torso of the first passenger when the first passenger is seated on the seat base,
wherein each of the elevated-height passenger seats comprises:
a seat base configured to allow a second passenger to sit thereon;
a seatback pivotably connected to the seat base and configured to support a torso of the second passenger when the second passenger is seated on the seat base; and
a hinge at an upper portion of the seatback,
wherein, with respect to each of the non-elevated passenger seats except one that is by an aisle of the cabin:
the seat base is configured to move forward and open upwardly or downwardly with respect to a corresponding passenger,
the seatback is configured to transition between a vertical position and a lie-flat position which is at a same height as the seat base, and
the seatback is also configured to open sideway such that a space originally used for seat base and seatback is converted to a passage accessible by the corresponding passenger, and
wherein, with respect to each of the elevated-height passenger seats:
the elevated-height passenger seat is configured to rotate upwardly around the hinge,
when the elevated-height passenger seat rotates upwardly around the hinge, the elevated-height passenger seat transitions from a seating position to a lie-flat position with the seat base and the seatback forming a flat bed to allow the corresponding passenger to lie flat on the flat bed formed by the seat base and the seatback, and
the elevated-height seat is at an elevated height when in the lie-flat position.

18. The apparatus of claim 17, wherein, with respect to each of the non-elevated seats, a seat frame of the seatback and the seat base are configured to slide forward with respect to the corresponding passenger when the corresponding passenger is seated on the seat base, and wherein, as the seat frame and the seat base slide forward, the seatback pivots and slides to form a flat bed together with the seat base to allow the corresponding passenger to lie flat on the flat bed formed by the seat base and the seatback.

19. The apparatus of claim 18, wherein a first non-elevated seat of the non-elevated seats is a window-side seat disposed next to a window of the cabin of the transportation, and wherein a height of a flat bed formed by the first non-elevated seat is lower than a height of each of one or more other flat beds formed by one or more other non-elevated seats of the plurality of non-elevated seats.

20. The apparatus of claim 17, wherein, with respect to each of the non-elevated seats, a seat frame of the seatback is connected to a sliding bar that allows the seat frame of the seatback to swing open or closed.

21. The apparatus of claim 17, wherein, with respect to each of the elevated-height seats, the passenger seat further comprises a luggage compartment under the seat base and configured to contain one or more pieces of luggage therein, and wherein the luggage compartment is accessible by the corresponding passenger and another passenger of another seat behind the passenger seat.

22. The apparatus of claim 21, wherein a first elevated-height seat of the elevated-height seats is a window-side seat disposed next to a window of the cabin of the transportation, and wherein dimensions of the luggage compartment of the first elevated-height seat is different from dimensions of the luggage compartment of each of one or more other elevated-height seats of the plurality of elevated-height seats.

23. The apparatus of claim 17, wherein, with respect to each of the elevated-height seats, the passenger seat further comprises an electrical, pneumatic or hydraulic actuator configured to rotate the passenger seat around the hinge to transition between the seating position and the elevated position.

24. The apparatus of claim 17, wherein a first elevated-height seat of the elevated-height seats is a window-side seat disposed next to a window of the cabin of the transportation, and wherein a height of a flat bed formed by the first elevated-height seat is lower than a height of each of one or more other flat beds formed by one or more other elevated-height seats of the plurality of elevated-height seats.

25. The apparatus of claim 17, further comprises:
a plurality of roller curtains disposed on both sides of each of the non-elevated passenger seats and the elevated-height passenger seats, each of the roller curtains configured to expand and retract between an open position and a closed position,
wherein, when in the open position, each of the roller curtains provides privacy on a respective side of a corresponding passenger seat and prevents a respective passenger from falling off a respective seat.

26. The apparatus of claim 17, further comprises:
a plurality of foot compartments located above the row of the plurality of non-elevated passenger seats, the plurality of foot compartments configured to provide additional storage space for passengers of the row of the plurality of elevated-height passenger seats.

27. The apparatus of claim 17, further comprises:
a plurality of foot compartments each located below a respective one of the elevated-height seats, each of the foot compartments configured to provide additional storage space for a respective passenger of a respective one of the non-elevated seats.

28. The apparatus of claim 17, further comprises:
a plurality of grooves or seat rails on a floor of the cabin, the grooves or seat rails configured to guide seat carts of the non-elevated seats to allow the seat bases and seat frames of the non-elevated seats to slide forward to form flat beds and be locked in place.

29. The apparatus of claim 17, with respect to each of the elevated-height seats, further comprises:
one or more sensors capable of detected an existence of any passenger in a common passage in which the elevated-height passenger seat is located when the elevated-height passenger seat is in the lie-flat position such that, when an existence of at least one passenger in the common passage is detected, the elevated-height passenger seat is prevented from transitioning to a seating position from the lie-flat position.

30. The apparatus of claim 17, with respect to each of the elevated-height seats, further comprising;
a hood above the elevated-height passenger seat that rotates to a vertical orientation to a surface of the seatback when the elevated-height passenger seat is transitioned from the seating position to the lie-flat position to provide privacy from behind for the corresponding passenger.

\* \* \* \* \*